US008919752B2

(12) United States Patent
DeFranks et al.

(10) Patent No.: US 8,919,752 B2
(45) Date of Patent: Dec. 30, 2014

(54) MICROALLOYED SPRING

(71) Applicant: Dreamwell, Ltd., Las Vegas, NV (US)

(72) Inventors: Michael S. DeFranks, Decatur, GA (US); William J. Ready, Atlanta, GA (US); Jeremy B. Lynn, Newnan, GA (US)

(73) Assignee: Dreamwell, Ltd., Las Vegas, NV (US)

( * ) Notice: Subject to any disclaimer, the term of this patent is extended or adjusted under 35 U.S.C. 154(b) by 0 days.

(21) Appl. No.: 13/916,904

(22) Filed: Jun. 13, 2013

(65) Prior Publication Data
US 2013/0270755 A1   Oct. 17, 2013

Related U.S. Application Data

(63) Continuation of application No. 12/106,216, filed on Apr. 18, 2008, now Pat. No. 8,474,805.

(51) Int. Cl.
| | | |
|---|---|---|
| *F16F 1/06* | (2006.01) | |
| *A47C 27/06* | (2006.01) | |
| *F16F 1/02* | (2006.01) | |
| *A47C 27/00* | (2006.01) | |
| *B60N 2/70* | (2006.01) | |
| *A47C 31/00* | (2006.01) | |
| *A47C 23/043* | (2006.01) | |
| *F16F 1/04* | (2006.01) | |

(52) U.S. Cl.
CPC ............. *F16F 1/06* (2013.01); *A47C 27/064* (2013.01); *F16F 1/021* (2013.01); *A47C 27/005* (2013.01); *B60N 2/7094* (2013.01); *A47C 31/007* (2013.01); *A47C 23/0438* (2013.01); *A47C 31/001* (2013.01); *A47C 27/065* (2013.01); *F16F 1/04* (2013.01)

USPC ............ 267/166; 267/148; 267/149; 267/169

(58) Field of Classification Search
CPC .................................. F16F 1/041; F16F 1/021
USPC .......... 267/166, 169, 149, 148; 428/592, 457, 428/681–685; 420/90–93
See application file for complete search history.

(56) References Cited

U.S. PATENT DOCUMENTS

| | | | |
|---|---|---|---|
| 4,072,510 A | 2/1978 | Smellie et al. | |
| 4,265,679 A | 5/1981 | Ohashi et al. | |
| 4,875,933 A | 10/1989 | Wan | |
| 4,993,376 A | 2/1991 | Fukutome et al. | |

(Continued)

FOREIGN PATENT DOCUMENTS

| | | |
|---|---|---|
| EP | 0647725 A1 | 4/1995 |
| EP | 1577411 A1 | 9/2005 |
| EP | 1698712 A1 | 9/2006 |

OTHER PUBLICATIONS

Office Action issued in European Patent Application No. 09733128. 4-2424, dated Jan. 21, 2013; 5 pages.

(Continued)

*Primary Examiner* — Thomas Irvin
*Assistant Examiner* — Mahbubur Rashid
(74) *Attorney, Agent, or Firm* — Cantor Colburn LLP

(57) ABSTRACT

The systems and methods described herein include innerspring assemblies or innerspring cores for use with cushioning articles such as mattresses. The innerspring core may have one or more coil springs formed from a high-carbon steel wire alloyed with one or more suitable alloying elements such as titanium and copper and capable of imparting greater strength and durability to the innerspring core.

9 Claims, 7 Drawing Sheets

(56) References Cited

U.S. PATENT DOCUMENTS

| | | |
|---|---|---|
| 6,322,747 B1 | 11/2001 | Fukuzumi et al. |
| 6,338,763 B1 | 1/2002 | Hashimura et al. |
| 6,931,685 B2 | 8/2005 | Kuchel et al. |
| 6,944,899 B2 | 9/2005 | Gladney |
| 6,996,091 B2 | 2/2006 | Quiring et al. |
| 7,047,581 B2 | 5/2006 | Gladney |
| 7,074,282 B2 | 7/2006 | Ibaraki et al. |
| 7,168,117 B2 | 1/2007 | Gladney et al. |
| 8,006,529 B2 | 8/2011 | DeFranks et al. |
| 8,099,811 B2 | 1/2012 | Gladney et al. |
| 2003/0172531 A1 | 9/2003 | Bhagwat et al. |
| 2004/0025987 A1 | 2/2004 | Bhagwat et al. |
| 2004/0079067 A1 | 4/2004 | Yoshikawa et al. |
| 2004/0158929 A1 | 8/2004 | Gladney |
| 2005/0005354 A1 | 1/2005 | Gladney et al. |
| 2005/0055778 A1 | 3/2005 | Kuchel |
| 2006/0065334 A1 | 3/2006 | Bhagwat et al. |
| 2007/0118987 A1 | 5/2007 | Gladney et al. |
| 2009/0106908 A1 | 4/2009 | DeFranks et al. |

OTHER PUBLICATIONS

Staiger, M.P., et al,, "Microalloying with Titanium to Improve Drawability in Low Carbon Wire-Red Steels," Materials Science Forum, 284-286:575-582 (1998).

ETCHANT: NITAL          MAGNIFICATION: 1,000X

ETCHANT: NITAL          MAGNIFICATION: 1,000X

MICROALLOYED SPRING

CROSS-REFERENCE TO RELATED APPLICATIONS

This application is a CONTINUATION application of U.S. application Ser. No. 12/106,216, filed Apr. 18, 2008, which is incorporated by reference herein it its entirety.

FIELD OF THE INVENTION

This invention generally relates to coil springs for use with an innerspring core in cushioning articles such as mattresses.

BACKGROUND OF THE INVENTION

A standard mattress assembly includes one or more layers of padding disposed on an innerspring core. Typically, the innerspring core includes a plurality of coil springs that are closely packed together in an array having a generally rectangular shape in plan with the ends of the springs lying in a common plane. The coil springs have longitudinal axes oriented parallel to one another. Conventionally, each spring is manufactured from a single, solid, coiled steel.

During its lifetime, mattresses, and particularly the innerspring core, endures significant stresses from daily use. Such repetitive daily use causes the coil springs in these innerspring cores to undergo many cycles of compression and release. Consequently, physical characteristics of these springs, such as coil length and pitch, begin to change over time. Moreover, the springs lose some tensile strength and become generally weaker.

To increase the durability and comfort of these mattresses, manufacturers include one or more additional layers of support and padding above and below the innerspring core. These additional layers help maintain the integrity of the innerspring core by redistributing some of the forces and stresses away from the coil springs. However, the additional layers add extra bulk and weight to the mattress assembly.

Other manufacturers have experimented with different shapes and arrangements of these coil springs, and have also attempted to add one or more strands to the coil springs to strengthen the innerspring core. However, these techniques are not as effective in redistributing the stresses and inevitably require additional layers of padding.

Accordingly, there is a need for a cushioning article configured with a stronger and more durable innerspring core while keeping the weight and size to a minimum

SUMMARY

The systems and methods described herein include innerspring assemblies or innerspring cores for use in cushioning articles such as mattresses. The innerspring core may have one or more coil springs that are relatively light, yet stronger and more durable than traditional coil springs. The coil springs may be formed from a high-carbon steel wire alloyed with one or more suitable alloying elements such as titanium and copper and capable of imparting greater strength and durability to the innerspring core.

For purposes of clarity, and not by way of limitation, the systems and methods may be described herein in the context of providing innerspring cores for mattresses. However, it will be appreciated that the principles described herein may be adapted to a wide range of applications. For example, the principles of this disclosure may be applied to couches where a cushion is affixed to a larger assembly. In addition, the principles may be applied to chairs, loveseats, sofas, daybeds, automotive seats, crib mattresses, fold-out couches, and folding mattresses. More generally, the systems described herein may be employed in any environment where it is desirable to provide cushioning support.

More particularly, in one aspect, the systems and methods described herein include coil springs for use with an innerspring assembly in a cushioning article. The coil springs may comprise a steel wire coiled into a helical spring and alloyed with at least one alloying element. In certain embodiments, the steel wire comprises a high carbon steel wire. The high carbon steel wire may include carbon that is from about 0.55 to about 0.99 weight percent of the spring. In certain embodiments, the spring includes about four times more carbon than at least one of the alloying elements. The spring may include about ten times more carbon than at least one of the alloying elements. The spring may include any ratio of carbon to the alloying element depending on the application without departing from the scope of the invention.

The alloying elements may include at least one of titanium, manganese, vanadium, chromium, niobium, nickel, molybdenum, and copper. The alloying element may be from about 0.001 to about 2 weight percent of the spring. The alloying element may include titanium that is from about 0.001 to about 0.1 weight percent of the spring. The titanium may be from about 0.001 to about 0.01 weight percent of the spring. In certain embodiments, the alloying element may include copper that is from about 0.1 to about 0.3 weight percent of the spring. The alloying elements may include titanium and copper, such that the spring includes from about 10 to about 30 times more copper than titanium.

In certain embodiments, the alloying elements includes manganese that is from about 0.3 to about 0.9 weight percent of the spring 100 and/or phosphorous that is less than about 0.04 weight percent and/or sulfur that is less than about 0.05 weight percent and/or silicon that is less than about 0.55 weight percent and/or lead that is from about 0.15 to about 0.35 weight percent and/or boron that is from about 0.0005 to about 0.003 weight percent and/or chromium that is from about 0.001 to about 2 weight percent and/or nickel that is from about 0.001 to about 2 weight percent and/or molybdenum that is from about 0.001 to about 1.15 weight percent and/or niobium that is from about 0.001 to about 0.1 weight percent and/or aluminum that is about 0.003 weight percent and/or zirconium that is less than about 0.15 weight percent and/or vanadium that is from about 0.001 to about 0.23 weight percent of the spring.

In certain embodiments, the steel wire includes a plurality of strands. The plurality of strands may be twisted together. In particular, the plurality of strands may include two, three or more strands twisted together. In certain embodiments, each of the strands has a helical twist with a direction that is opposite to a twist direction of the stranded coil spring. The plurality of strands may be joined at least at respective ends of the spring. In certain embodiments, the plurality of strands all have approximately equal outside diameters. Alternatively, at least one of the plurality of strands may have an outside diameter different from that of at least one other of the plurality of strands.

In certain embodiments, the coil spring comprises an encasing material formed around the helical spring. The encasing material may form a pocket around the spring. The encasing material may include at least one of polyester, polypropylene and foam such as polyurethane foam, polyethylene foam and latex foam.

In certain embodiments, the steel wire has a diameter from about 0.04 inches to about 0.11 inches. The spring may have a free height, e.g., uncompressed, from about 3.5 inches to about 13.5 inches. In certain embodiments, the coil spring may include an upper substantially frustoconical spring coil portion, and a lower substantially cylindrical spring portion disposed below the upper spring portion. The coil spring may be configured such that the upper portion may compress substantially before the lower portion begins to compress.

In another aspect, the systems and methods described herein include innerspring assemblies having a plurality of spring coils. In such an aspect, at least one spring coil may comprise a high-carbon steel wire coiled into a helical spring and alloyed with at least one of titanium, manganese, vanadium, chromium, nickel, molybdenum, and copper. The alloying element may be from about 0.001 to about 1 weight percent of the spring. In certain embodiments the spring coil may include at least one of an encased coil, an open coil and a continuous coil.

In yet another aspect, the systems and methods described herein include cushioning articles. The cushioning articles may comprise an innerspring core including a plurality of spring coils, at least one spring coil having a high-carbon steel wire coiled into a helical spring and alloyed with titanium and copper. In certain embodiments, the cushioning article further comprises at least one layer of upholstery disposed on the innerspring core. The cushioning article may include one or more backing layers disposed on the innerspring core. Additionally and optionally, the cushioning article may include one or more layers of foam, fiber batting, down, natural fibers, feathers and hair disposed on the innerspring core.

In another aspect, the systems and methods described herein include methods of manufacturing a coil spring. The methods may comprise providing alloyed rods including high-carbon steel and at least one of titanium, manganese, vanadium, chromium, nickel, molybdenum, and copper. The methods may further include exposing the alloyed rods to one or more cycles of heat-treatment, drawing a wire from the heat-treated alloyed rods, and generating one or more helical springs by passing the drawn wire through a coil winder. In certain embodiments, the heat-treatment includes at least one of annealing, hardening, precipitation strengthening, tempering, quenching and austenizing. In certain embodiments, the method further comprises exposing the drawn wire to one or more cycles of heat-treatment. Additionally and optionally, the method may comprise exposing the one or more helical springs to one or more cycles of heat-treatment.

BRIEF DESCRIPTIONS OF THE SEVERAL VIEWS OF THE DRAWINGS

The foregoing and other objects and advantages of the invention will be appreciated more fully from the following further description thereof, with reference to the accompanying drawings wherein.

DETAIL DESCRIPTION OF THE ILLUSTRATED EMBODIMENTS

To provide an overall understanding of the invention, certain illustrative embodiments will now be described, including a mattress having at least one microalloyed coil spring. However, the embodiments set out below are merely for the purpose of illustration and it will be understood by one of ordinary skill in the art that the systems and methods described herein may be adapted and modified for other suitable applications and that such other additions and modifications will not depart from the scope hereof.

Figure 1:
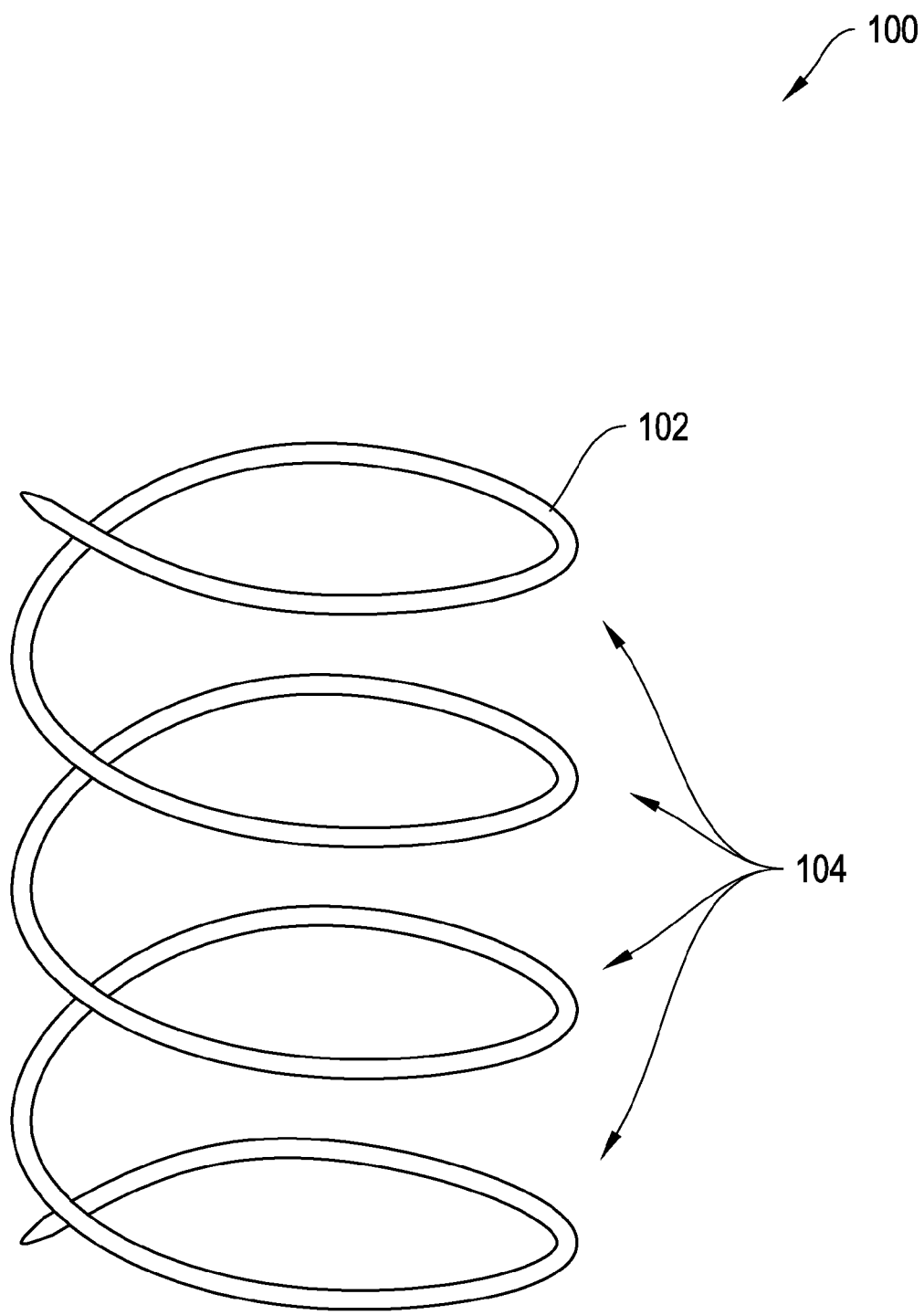
FIG. 1 depicts a microalloyed coil spring, according to an illustrative embodiment of the invention.

FIG. 1 depicts a microalloyed coil spring 100, according to an illustrative embodiment of the invention. The coil spring 100 includes a wire 102 that is coiled into a helical shape. The free height of the spring 100 is the height of the spring 100 when little or no force is applied to it and each of the coils 104 are at a resting state. In certain embodiments, the spring 100 has a free height from about 3.5 inches to about 13.5 inches. The wire 102 may have a diameter from about 0.04 inches to about 0.11 inches. The wire 102 may be formed from a steel wire alloyed with one or more alloying elements.

In certain embodiments, the wire 102 comprises high carbon steel. Carbon content in the high carbon steel wire 102 may range from about 0.55 to about 0.99 weight percent of the spring 100. The wire 102 may include one or more high carbon steel grades standardized by the American Iron and Steel Institute ("AISI") including at least one of AISI 1055, AISI 1059, AISI 1060, AISI 1064, AISI 1065, AISI 1069, AISI 1070, AISI 1074, AISI 1075, AISI 1078, AISI 1080, AISI 1084, AISI 1085, AISI 1086, AISI 1090 and AISI 1095. In other embodiments, the wire 102 may include one or more high carbon steel grades described under the Unified Numbering System ("UNS") including at least one of UNS G10740, UNS G10750, and UNS G15720.

The wire 102 may include an alloying element such as titanium alloyed with high carbon steel. The titanium in the wire 102 may range from about 0.001 to about 0.01 weight percent of the spring 100. In certain embodiments, the titanium may range from about 0.001 to about 0.1 weight percent of the spring 100. Generally, titanium may comprise less than about 0.1 weight percent of the spring 100. Not to be bound by theory, but generally, high carbon steel tends to have a dense microstructure with limited interstitial volume. Adding relatively small amounts of titanium may be advantageous because the titanium may form an interstitial alloy with the high carbon steel; the titanium atoms may fill some of the interstitial volume, thereby strengthening the wire 100. In certain embodiments, the titanium may form a substitutional alloy with the high carbon steel; the titanium atoms may substitute one or more carbon atoms in the crystal structure. Current-day steel springs do not include titanium because it tends to increase the spring's brittleness. Consequently, although the steel-titanium alloy is stronger, it is also more difficult to draw into a wire, let alone coil into a spring. The systems and methods described herein overcome these limitations by combining one or more other alloying elements such as copper and/or subjecting the alloy to heat treatments. As will be described in more detail later with reference to FIGS. 5, 6A and 6B, the microalloyed high carbon steel wire 102 may be subject to one or more heat treatments to help modify the wire's 102 phase morphology and/or one or more physical properties.

In certain embodiments, the wire 102 may comprise one or more titanium-iron alloy grades selected from a group consisting of ASTM A514 Type B, ASTM A514 Type D, ASTM A514 Type E, ASTM A514 Type L, ASTM A517 Type B, ASTM A517 Type D, ASTM A517 Type E, ASTM A517 Type L, ASTM A538 Type A, ASTM A538 Type B, ASTM A538 Type C, ASTM A562, ASTM A588 Type G, ASTM A588 Type H, ASTM A588 Type J, ASTM A590, ASTM A656 Grade 2, ASTM A715 Grade 1, ASTM A715 Grade 4, ASTM 6512, ASTM 6514, ASTM 6520, and ASTM 6521.

In certain embodiments, the wire 102 includes one or more additional alloying elements capable of modifying one or more physical properties of the wire and consequently, the performance of the spring 100. Depending on the size of its atoms, the alloying elements may form substitutional alloys and/or interstitial alloys. In substitution alloys, the atoms of the components may be approximately the same size and the various atoms are simply substituted for one another in the crystal structure. Interstitial alloys occur when the atoms of one component may be substantially smaller than the other and the smaller atoms fit into the spaces (interstices) between the larger atoms. As an example, the wire 102 may be alloyed with copper. In certain embodiments, the wire 102 comprises copper that is from about 0.1 to about 0.3 weight percent of the spring 100. In another embodiment, the wire 102 comprises copper that is about 0.55 weight percent of the spring 100. The wire 102 may include from about 10 to about 30 times more copper than titanium. The wire 102 may include any desirable amount of copper to help improve its drawability (ductility).

Coil springs formed from titanium and copper alloyed steel wire 102 generally have a longer working life than traditional steel springs. Particularly, the performance of springs may be estimated by analyzing the decrease in free height of the spring after a certain number of compression cycles. During their lifetime, one or more coil springs in a cushioning article lose some of their free height resulting in areas of shorter springs. This creates an uneven surface on the cushioning article. However, as seen below in Table 1, after about two million cycles, the titanium based microalloyed coil spring 100 loses about 15% less free height than a traditional steel coil spring.

TABLE 1

| | # Cycles 8" to 5" | | | | | | | | | | | | | |
|---|---|---|---|---|---|---|---|---|---|---|---|---|---|---|
| | Std. | | | | | | | | | | | | | |
| Specimen # | 10 | 100 | 1,000 | 2,000 | 3,000 | 4,000 | 5,000 | 35K | 70K | 100K | 500K | 1M | 1.5M | 2M |
| 1 | 9.65 | 9.65 | 9.57 | 9.57 | 9.57 | 9.57 | 9.53 | 9.53 | 9.53 | 9.53 | 9.53 | 9.49 | 9.49 | 9.49 |
| 2 | 9.65 | 9.65 | 9.57 | 9.57 | 9.57 | 9.57 | 9.53 | 9.49 | 9.49 | 9.49 | 9.49 | 9.45 | 9.45 | 9.45 |
| 3 | 9.72 | 9.72 | 9.53 | 9.53 | 9.53 | 9.53 | 9.53 | 9.53 | 9.53 | 9.53 | 9.53 | 9.45 | 9.45 | 9.45 |
| 4 | 9.69 | 9.69 | 9.51 | 9.57 | 9.53 | 9.53 | 9.53 | 9.53 | 9.53 | 9.53 | 9.53 | 9.41 | 9.45 | 9.45 |
| 5 | 9.53 | 9.53 | 9.57 | 9.49 | 9.49 | 9.49 | 9.45 | 9.45 | 9.45 | 9.45 | 9.45 | 9.41 | 9.41 | 9.41 |
| 6 | 9.61 | 9.61 | 9.53 | 9.49 | 9.49 | 9.49 | 9.49 | 9.49 | 9.49 | 9.49 | 9.49 | 9.45 | 9.45 | 9.45 |
| Avg. | 9.64 | 9.64 | 9.56 | 9.53 | 9.53 | 9.53 | 9.51 | 9.50 | 9.50 | 9.60 | 9.50 | 9.44 | 9.45 | 9.45 |
| | Ti-based | | | | | | | | | | | | | |
| Specimen # | 10 | 100 | 1,000 | 2,000 | 3,000 | 4,000 | 5,000 | 35K | 70K | 100K | 500K | 1M | 1.5M | 2M |
| | Free height (in) | | | | | | | | | | | | | |
| 1 | 10.08 | 10.08 | 10.08 | 10.08 | 10.08 | 10.08 | 10.08 | 10.08 | 10.08 | 10.08 | 10.08 | 10.04 | 10.04 | 10.04 |
| 2 | 9.92 | 9.92 | 9.88 | 9.88 | 9.88 | 9.88 | 9.84 | 9.84 | 9.84 | 9.84 | 9.84 | 9.80 | 9.80 | 9.80 |
| 3 | 10.39 | 10.39 | 10.28 | 10.28 | 10.24 | 10.24 | 10.16 | 10.16 | 10.16 | 10.16 | 10.16 | 10.12 | 10.12 | 10.12 |
| 4 | 9.88 | 9.88 | 9.84 | 9.80 | 9.80 | 9.80 | 9.80 | 9.80 | 9.80 | 9.80 | 9.80 | 9.76 | 9.76 | 9.76 |
| 5 | 9.88 | 9.88 | 9.84 | 9.80 | 9.80 | 9.80 | 9.80 | 9.80 | 9.80 | 9.80 | 9.80 | 9.76 | 9.76 | 9.76 |
| 6 | 10.04 | 10.04 | 10.00 | 9.96 | 9.92 | 9.92 | 9.88 | 9.88 | 9.88 | 9.88 | 9.88 | 9.84 | 9.84 | 9.84 |
| Avg. | 10.05 | 10.05 | 10.01 | 9.99 | 9.97 | 9.97 | 9.94 | 9.94 | 9.94 | 9.94 | 9.94 | 9.89 | 9.89 | 9.89 |

Six traditional coil springs ("Std." 1-6) and six titanium based microalloyed coil springs ("Ti-Based"1-6) were tested. The traditional springs had an average initial free height of about 9.64". The miroalloyed springs had an average initial free height of about 10.05". During each compression cycle, the springs were compressed and released from a height of about 8" to about 5". Each of the sample coils listed in Table 1 were compression tested to 2,000,000 cycles at 50% compression and 190 strokes per minute. During, testing, the free height (or free length) of the coils were measured at various times.

In other embodiments, the steel wire 102 may be alloyed with other alloying elements including at least one of manganese, phosphorous, sulfur, silicon, lead, boron, aluminum, zirconium, vanadium, chromium, niobium, nickel and molybdenum. Generally, the alloying element may be from about 0.001 to about 2 weight percent of the spring 100. Specifically, in certain embodiments, the steel wire 102 may include manganese that is from about 0.3 to about 0.9 weight percent of the spring 100 and/or phosphorous that is less than about 0.04 weight percent and/or sulfur that is less than about 0.05 weight percent and/or silicon that is less than about 0.55 weight percent and/or lead that is from about 0.15 to about 0.35 weight percent and/or boron that is from about 0.0005 to about 0.003 weight percent and/or chromium that is from about 0.001 to about 2 weight percent and/or nickel that is less than about 10 weight percent and/or molybdenum that is less than about 1.15 weight percent and/or niobium that is less than about 0.1 weight percent and/or aluminum that is about 0.003 weight percent and/or zirconium that is less than about 0.15 weight percent and/or vanadium that is less than about 0.03 weight percent of the spring 100. In certain embodiments, the wire 102 may include about four times more carbon that at least one of the alloying elements.

Material selection for the wire 102 may be based on a number of factors, including temperature range, tensile strength, elastic modulus, fatigue life, corrosion resistance, cost, etc. One or more alloying elements may be combined as desired to modify the aforementioned factors. In certain embodiments, electronegativity or electropositivity of an alloying element may be leveraged to scavenge and remove undesirable materials. As an example, in certain applications, sulfur may be an undesirable element in steel alloys. In such an example, titanium may be combined with the alloyed steel whereby the titanium binds with the sulfur, thereby mitigating some of the undesirable effects of sulfur. In certain embodiments, titanium may combine with oxygen and assist in deoxygenating the wire 102. In other embodiments, the wire 102 can be surface-treated, such as by being galvanized or coated with a plastic or epoxy.

Figure 2:
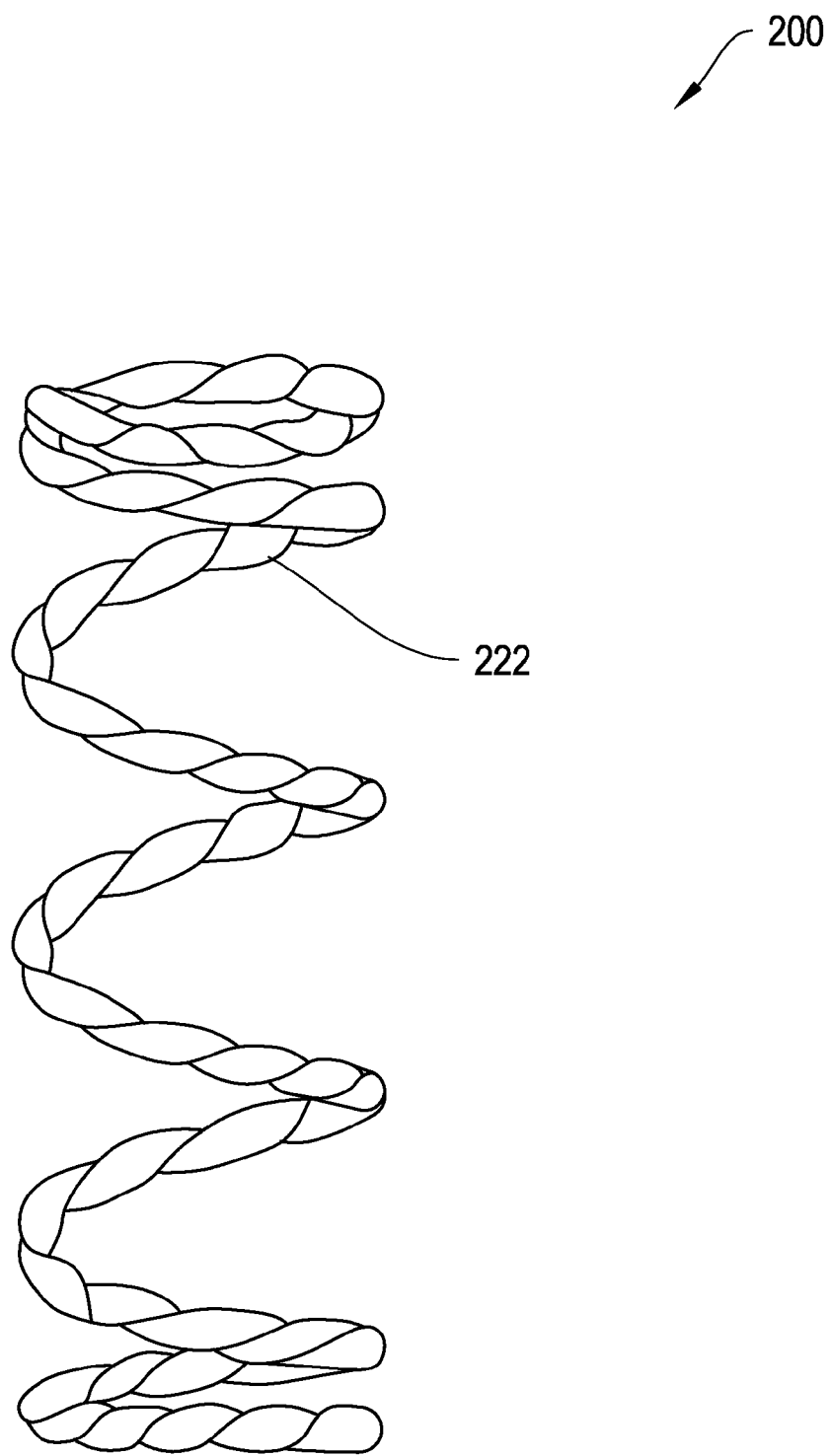
FIG. 2 depicts a muitistranded microalloyed coil spring, according to an illustrative embodiment of the invention.

FIG. 2 shows schematically a multi-strand coil spring 200 according to an illustrative embodiment of the invention. The coil spring 200 employs a multi-strand cord 222, which is bent to form the coil spring 200. In certain embodiments, least two strands or wires are twisted to form the multi-strand cord 222. Each strand may be formed from a wire similar to wire 102 of coil spring 100 depicted in FIG. 1. However, the number of strands employed varies according to the application and the type of material used to form the strands. In some constructions, the cord 222 is formed from braiding or twisting three or more strands. In one construction, the multi-strand cord 222 includes from three to about fifty twisted or braided strands.

The strands may be twisted, woven, clipped or bonded together, and any suitable method for forming the multi-strand coil spring may be employed without departing from the scope of the invention. Moreover, the strands may have an ovular, circular, hexagonal, square, flattened version of any of the preceding or any other suitable cross-sectional geometry, and may be formed into any number of coils. Also, the coils themselves may be formed as active or inactive coils, and may all have substantially equal coil diameters. Alternatively, the coil diameter may vary from coil to coil, and may be arranged, for example to have sequentially increasing coil diameters, sequentially decreasing coil diameters, or some combination of both, to form any suitable coil diameter pattern, for example, for forming a coil spring having a variable spring rate.

The exemplary multi-strand coil spring 200 can be fabricated by initially providing the individual strands with a helical twist prior to the cording operation. The helix of the multi-strand spring preferably opposes the helix of the individual strands to counteract a tendency of the strands to loosen when the spring is operated, i.e., compressed. Additionally, as with conventional springs, a torque is applied to the cord during coiling.

The individual strands may be connected to each other at least at the ends of the coil. Since the strands can rub against each other over the length of the coil, which can cause fretting and premature wear, the strands may be coated and/or pre-galvanized or otherwise treated. Moreover, the multi-strand coil may also be sealed/coated with a sealant, such as an epoxy. Generally, the coil spring 200 may include a multi-strand coil such as those described with reference to U.S. Pat. Nos. 6,944,899, 7,047,581, 7,168,117, and U.S. patent application Ser. No. 11/699,184, each of which are incorporated herein by reference in their entirety.

Figure 3A:
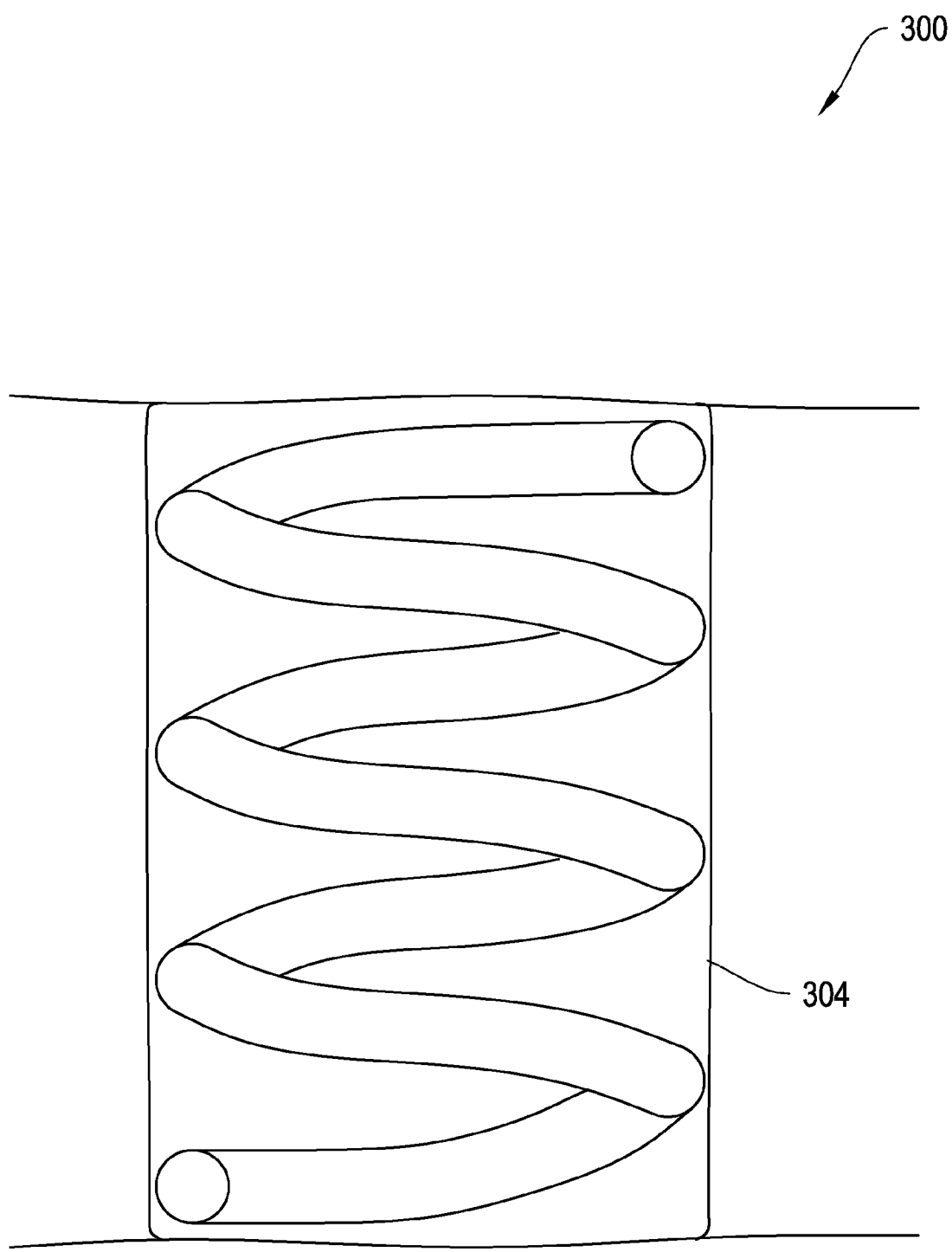
FIG. 3A depicts an encased microalloyed coil spring, according to an illustrative embodiment of the invention.

FIG. 3A depicts an encased microalloyed coil spring 300, according to an illustrative embodiment of the invention. The spring coil 300 may have an encasing material 304, such as fabric. The encasing material may be, for example, fabric or foam. In certain embodiments, the encasing material 304 includes at least one of polyester and polypropylene. In certain embodiments, the encasing material 304 includes fire-retardant material. The encasing material may form a pocket and may be useful to attach together a row of adjacent spring coils. Encased coils may also improve the manufacturing process by obviating the need to connect adjacent open coils with hog rings or other fasteners.

In certain embodiments, the coil spring 100 or 200 may then be passed to an encasing machine or station to encase the springs into encasing 304 such as non-woven, non-allergenic fabric. Each sleeve may be ultrasonically sealed by a process where the fibers are melted together to form plastic seams, which are secure and tear-resistant. The coils 100 or 200 may then be fusion bonded to produce a strong, stable construction. The number of coils in each unit may vary, and the types of coils and the number of strands and gauge of strands can vary from encasement to encasement, and multi-strand coils may be employed in combination with single strand coils.

Figure 3B:
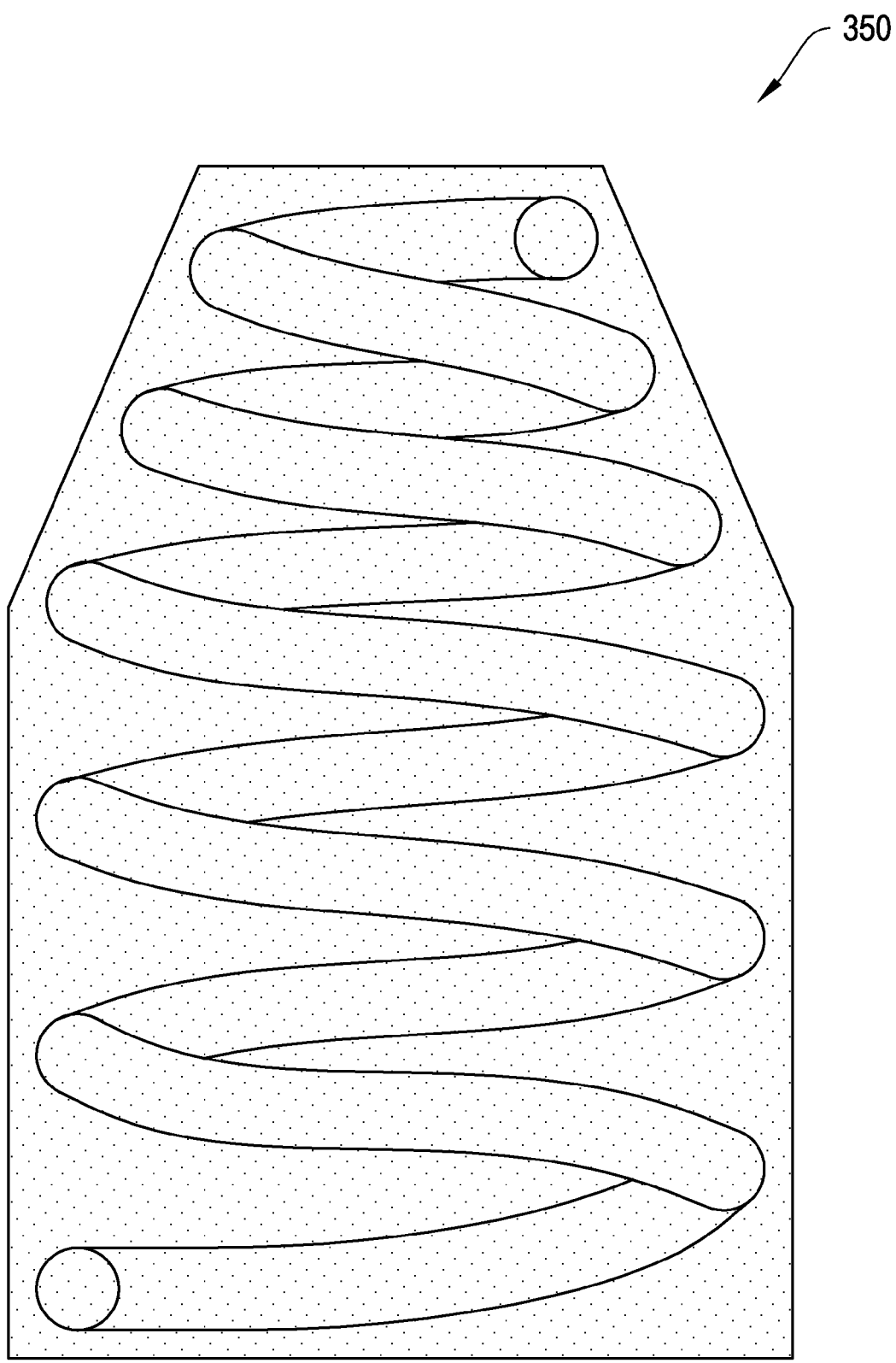
FIG. 3B depicts an encased asymmetrical microalloyed coil spring, according to an illustrative embodiment of the invention.

In certain embodiments, the microalloyed coil springs 100, 200 or 300 are configured to provide a similar level of firmness to users with different weights. In such embodiments the coil springs may be asymmetrical in shape including portions having linear and non-linear spring rates. FIG. 3B depicts an encased asymmetrical coil spring 350, according an illustrative embodiment of the invention. The asymmetrical microalloyed spring 350 includes an upper conical or frustoconical portion and lower cylindrical portion. Such an arrangement allows a user of the mattress to experience non-linear compression without causing a substantial compression of the coil springs. Such a coil spring provides for a mattress that is sufficiently soft for lighter users and sufficiently firm for heavier users. In certain embodiments, the coil spring 350 may be similar to the coil springs described in U.S. Pat. No. 6,931,685 and U.S. patent application Ser. No. 11/978,869, each of which are incorporated herein by reference in their entirety.

Figure 4:
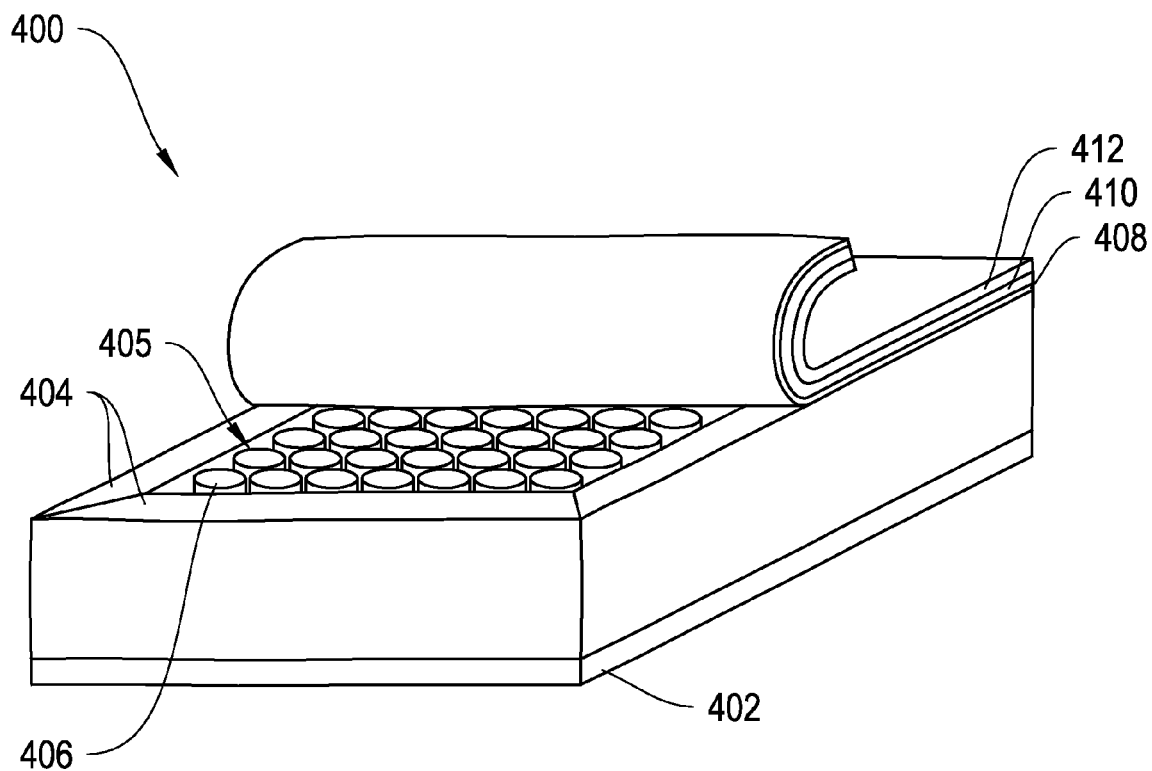
FIG. 4 depicts a cushion assembly having an innerspring core, according to an illustrative embodiment of the invention.

FIG. 4 depicts a mattress assembly 400 containing a plurality of microalloyed coil springs 406. The mattress 400 may have a bottom layer 402 and one or more top layers of upholstery 412 and foam 408. The mattress may also have one or more additional layers 410. The mattress 400 comprises at least one microalloyed coil spring 406 which may be encased in a pocket. The mattress 400 includes sidewalls 404 arranged around the periphery of the innerspring core 405. Adjacent encased springs may be connected with attachments such as glue.

The bottom layer 402 provides support to the mattress and prevents sagging. This layer may include rigid materials such as wood, metal, resins, or plastic. The upholstery layer 412 forms a soft but durable outer surface to the mattress. The upholstery layer may protect the inner components of the mattress against daily wear and tear. It also provides a soft sleeping surface for the mattress user. In certain embodiments, the mattress 400 may have additional layers 410. Additional layers 410 may include backing layers, fire-retardant materials to improve the safety of the mattress, water-resistant materials, water-proof materials, allergen-reducing material, mite-proof materials, or materials that protect against other organisms. Alternatively, an additional layer could be a soft material such as foam 408 that improves the comfort of the mattress.

The mattress 400 includes an innerspring assembly having at least one microalloyed coil spring 406. The spring 406 may be similar to the springs described with reference to FIGS. 1-3. The innerspring assembly could contain two or more different kinds of springs. For example, conventional steel springs may be used in one part of the mattress, and the microalloyed steel springs may be used in another part of the mattress. One or more microalloyed springs 406 in the mattress 400 may be encased in a pocket. This pocket may be made of fabric, foam, or other material. One continuous piece of encasing material may cover multiple coils, connecting them. Adjacent encased coils may alternatively be connected by gluing the encasing material together. Open coils, in contrast, may be connected with a hog ring or other fasteners.

Figure 5:
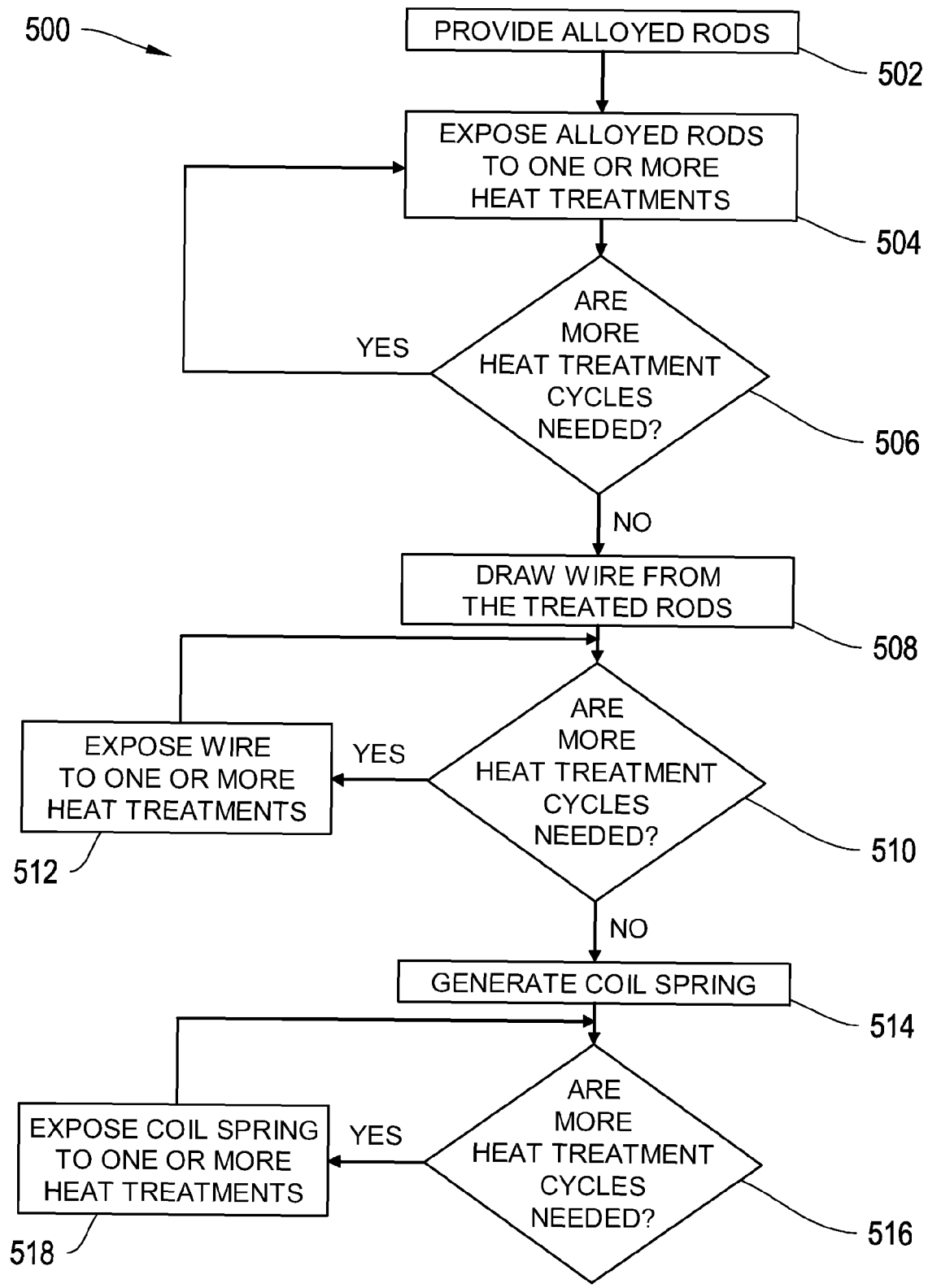
FIG. 5 is a flow chart depicting a method of manufacturing a microalloyed coil spring, according to an illustrative embodiment of the invention.

FIG. 5 is a flow chart depicting a process 500 of manufacturing a microalloyed coil spring 100, 200, 300 or 406, according to an illustrative embodiment of the invention. The process 500 begins with providing alloyed rods (step 502). The alloyed rods include steel or high-carbon steel alloyed with one or more alloying elements such as titanium, copper and other elements described earlier previously. The alloyed rods may be exposed to one or more cycles of heat treatment (steps 504 and 506).

Typically, heat treatment involves the heat and cooling of a material for the purpose of altering one or more physical or chemical properties. Heat treatment may typically include maintaining the material at a particular temperature (hot and/or cold) for a certain amount of time as desired. In certain embodiments, the temperature and time of heat treatment may be controlled and modified as desired without departing from the scope of the invention. A microalloyed rod may be exposed to some cycles of high and low temperatures to alter its morphology such that the atoms of the alloying element such as titanium dislocate the carbon atoms in the rod. In certain embodiments, the alloying element fills interstitial volume and combines with carbon to form alloy-carbon species such as TiC (titanium combining with carbon).

Heat treatment processes may include at least one of annealing, hardening, precipitation strengthening, tempering, quenching and austenizing. The process of annealing typically assists in changing properties such as strength and hardness. Annealing may be used to induce softness, relieve internal stresses within the alloyed rods and refine its structure. Hardening, tempering and quenching typically involve heating the alloyed rod to a high temperature into an austenitic crystal phase and then quickly cooled. Tempering and quenching may be used to improve ductility and impart some toughness.

Figure 6A:
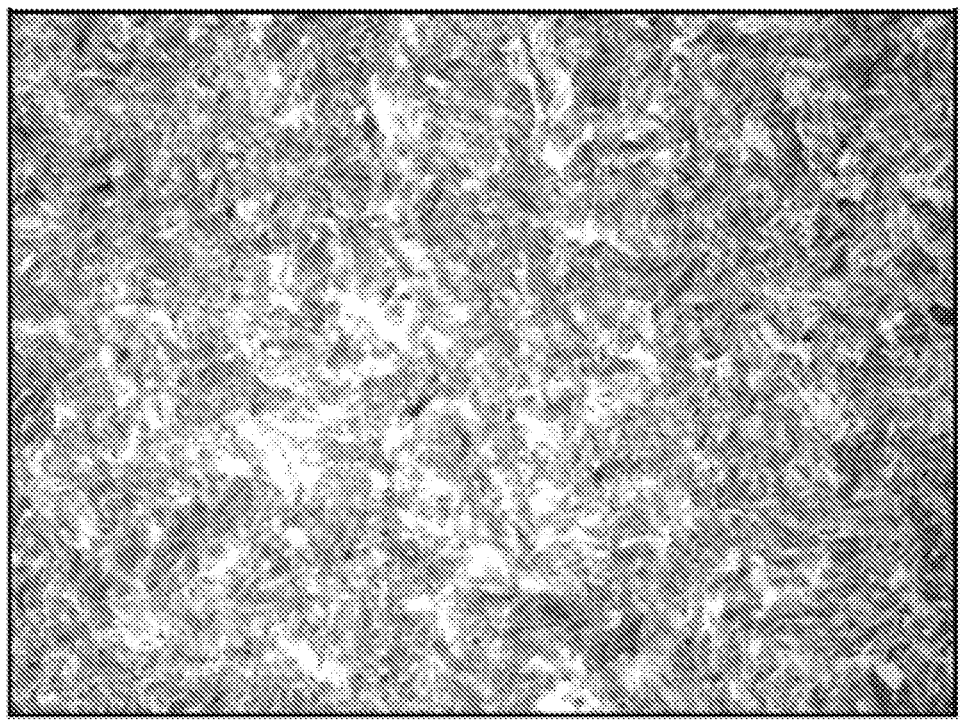
FIGS. 6A and 6B depict a transverse microscopic cross section of a steel coil spring and an exemplary microalloyed coil spring, respectively.
Figure 6B:
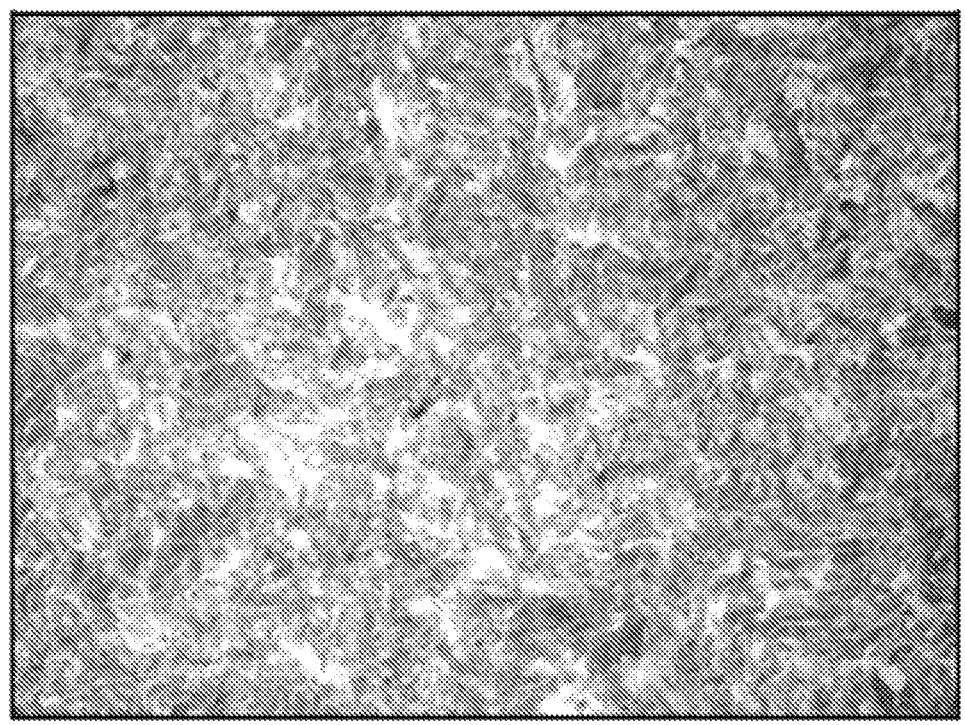

In certain embodiments, the nature and number of heat treatment cycles may be selected and performed based on, among other things, at least one of the austenite, pearlite and ferrite ratios of the steel alloyed rods. Turning to FIGS. 6A and 6B, depicted are transverse microscopic cross sections of a steel coil spring and an exemplary microalloyed coil spring, respectively. The darker regions are representative of a more ductile pearlitic state. The microalloyed material in FIG. 6B has more dark zones and consequently, has more pearlite than the steel in FIG. 6A.

Returning to FIG. 5, the alloyed rods are then drawn into wires and rolled into spools for later use (step 508). Generally, multiple cycles of heat treatment helps increase the ductility, strength and general flexibility. With improved properties, the microalloyed rods can be easily drawn into a wire similar to wire 102 of FIG. 1. The wire may then be exposed to one or more heat treatments similar to the heat treatments for the alloyed rods (steps 510 and 512).

The wire can then be coiled into a helical shape by passing the wire through a coil winder (step 510). According to one practice, the microalloyed springs described above can be formed from a multi-strand cord using a suitable coil winding machine that eliminates torsion in the feed cord, such as the coil winding machine disclosed in commonly assigned U.S. patent application Ser. No. 10/661,363, which is incorporated herein by reference in its entirety. Such continuous coils from multi-strand wire may be wound by maintaining the same winding sense between coils so as to prevent the individual strands from loosening during spring compression. In certain embodiments, the coiled wire is additionally and optionally exposed to one or more heat treatments similar to the heat treatments for the alloyed rods and the wire (steps 516 and 518).

Variations, modifications, and other implementations of what is described may be employed without departing from the spirit and scope of the invention. More specifically, any of the method, system and device features described above or incorporated by reference may be combined with any other suitable method, system or device features disclosed herein or incorporated by reference, and is within the scope of the contemplated inventions. The systems and methods may be embodied in other specific forms without departing from the spirit or essential characteristics thereof. The foregoing embodiments are therefore to be considered in all respects illustrative, rather than limiting of the invention. The teachings of all references cited herein are hereby incorporated by reference in their entirety.

What is claimed is:

1. A coil spring in an innerspring assembly in a cushioning article, comprising
a high-carbon steel wire coiled into a helical spring and alloyed with an alloying element wherein the high carbon steel wire includes carbon that is from about 0.50 to about 0.99 weight percent of the spring, wherein the high carbon steel wire has a diameter of 0.04 to 0.11 inches (1.016 to 2.794 millimeters);
wherein the alloying element comprises titanium ranging from 0.001 to about 0.1 weight percent of the spring and silicon ranging from 0.001 to less than 0.55 weight percent of the spring, and wherein a total amount of the alloying element is from about 0.001 to about 2 weight percent of the spring.

2. The coil spring of claim 1, wherein the alloying element includes manganese that is from about 0.3 to about 0.9 weight percent of the spring.

3. The coil spring of claim 1, wherein the alloying element includes vanadium that is from about 0.001 to about 0.23 weight percent of the spring.

4. The coil spring of claim 1, wherein the alloying element includes molybdenum that is from about 0.001 to about 1.15 weight percent of the spring.

5. The coil spring of claim 1, wherein the alloying element includes niobium that is from about 0.001 to about 0.1 weight percent of the spring.

6. The coil spring of claim 1, wherein the titanium is about 0.001 to about 0.01 weight percent of the spring.

7. The coil spring of claim 1, wherein the spring includes about four times more carbon than at least one of the alloying elements.

8. The coil spring of claim 1, wherein the steel wire includes a plurality of strands.

9. The coil spring of claim 1, further comprising an encasing material formed around the helical spring.

* * * * *